United States Patent
Bardiot et al.

(10) Patent No.: US 7,622,176 B2
(45) Date of Patent: Nov. 24, 2009

(54) HOT-EXTRUDABLE PRESSURE-SENSITIVE HOT-MELT ADHESIVES AND THEIR USE IN MULTILAYER FILMS

(75) Inventors: Anne Bardiot, Anet (FR); Nicolas Sajot, Denguin (FR); Pierre Gerard, Selles sur Cher (FR); Christophe Notteau, Noyon (FR)

(73) Assignee: Bostik SA, Paris La Defense Cedex (FR)

( * ) Notice: Subject to any disclaimer, the term of this patent is extended or adjusted under 35 U.S.C. 154(b) by 258 days.

(21) Appl. No.: 10/637,539

(22) Filed: Dec. 10, 2003

(65) Prior Publication Data

US 2004/0077759 A1 Apr. 22, 2004

Related U.S. Application Data

(63) Continuation of application No. PCT/FR02/00491, filed on Feb. 8, 2002.

(51) Int. Cl.
*B32B 7/12* (2006.01)
*B32B 15/04* (2006.01)
*B32B 9/00* (2006.01)
*B32B 33/00* (2006.01)

(52) U.S. Cl. .................. 428/40.1; 428/41.3; 428/343; 428/346; 428/355 R (58) Field of Classification Search .............. 428/40.1, 428/41.3, 343, 346, 349, 355 R, 355 BL
See application file for complete search history.

(56) References Cited

U.S. PATENT DOCUMENTS

| | | | |
|---|---|---|---|
| 4,388,349 A | 6/1983 | Korpman et al. | |
| 4,411,954 A * | 10/1983 | Butch et al. | 428/343 |
| 4,792,584 A * | 12/1988 | Shiraki et al. | 524/77 |
| 5,089,320 A | 2/1992 | Straus et al. | |
| 5,266,394 A | 11/1993 | Diehl et al. | |
| 5,271,999 A * | 12/1993 | Short | 442/151 |
| 5,403,658 A | 4/1995 | Southwick et al. | |
| 5,670,577 A | 9/1997 | Dawson, Jr. | |
| 5,714,254 A | 2/1998 | Jacob | |
| 5,853,874 A | 12/1998 | Jacob | |
| 6,184,285 B1 | 2/2001 | Hatfield et al. | |
| 6,511,723 B1 * | 1/2003 | Engelaere | 428/35.7 |
| 7,268,183 B2 | 9/2007 | Wintermantel et al. | |

FOREIGN PATENT DOCUMENTS

EP 160965 5/1985

(Continued)

*Primary Examiner*—Patricia L Nordmeyer
(74) *Attorney, Agent, or Firm*—Hunton & Williams LLP (57) ABSTRACT

The present invention relates to hot-coextrudable hot-melt pressure-sensitive adhesives particularly suitable for the production of multilayer films intended for what are called "repositionable" packages that are opened and reclosed easily. The films used in these packages comprise at least three layers, namely an outer layer intended to be complexed thereafter, a sealing and separable layer, defining all or part of the internal surface of the package, and between them a hot-melt adhesive layer that joins them together. In this type of package, the adhesive plays an essential role insofar as, once the package has been opened by the end user, the quality of the reclosure and of the reopening will depend on the performance of the adhesive, which is of course a pressure-sensitive adhesive, that is to say an adhesive that adheres simply by manual pressure.

27 Claims, 6 Drawing Sheets defined by the power equation:

$$\eta = 22000 \times (d\gamma/dt + 200)^{-0.82}$$

FOREIGN PATENT DOCUMENTS

| | | |
|---|---|---|
| EP | 0 160 975 A2 | 11/1985 |
| EP | 0 676 426 A1 | 10/1995 |
| EP | 1 053 953 A1 | 10/1995 |
| EP | 0 802 251 A1 | 10/1997 |
| EP | 1 053 952 A1 | 11/2000 |
| EP | 1053952 | 11/2000 |
| GB | 2 319 746 A | 12/1999 |
| JP | 05-311138 | 11/1993 |
| JP | 09-025399 | 1/1997 |
| JP | 2000-273405 | 3/2000 |
| JP | 2000-282006 | 10/2000 |
| WO | WO 85/02199 | 5/1985 |
| WO | WO 95 16755 | 6/1995 |
| WO | WO 98/000471 | 1/1998 |
| WO | WO 99/20709 | 4/1999 |

* cited by examiner

HOT-EXTRUDABLE PRESSURE-SENSITIVE HOT-MELT ADHESIVES AND THEIR USE IN MULTILAYER FILMS

This application is a continuation of Internation Patent Application No. PCT/FR 02/00491, filed on Feb. 8, 2002, which claims benefit of prioirty of French Application No. 01.01879, filed on Feb. 9, 2001.

FIELD OF INVENTION

The present invention relates to hot-coextrudable hot-melt pressure-sensitive adhesives particularly suitable for the production of multilayer films intended for what are called "repositionable" packages that are opened and reclosed easily.

BACKGROUND OF INVENTION

The films used in these packages comprise at least three layers, namely an outer layer intended to be complexed thereafter, a sealing and separable layer, defining all or part of the internal surface of the package, and between them a hot-melt adhesive layer that joins them together.

In this type of package, the adhesive plays an essential role insofar as, once the package has been opened by the end user, the quality of the reclosure and of the reopening will depend on the performance of the adhesive, which is of course a pressure-sensitive adhesive, that is to say an adhesive that adheres simply by manual pressure. These adhesives are usually known as PSAs (pressure-sensitive adhesives).

Various techniques or processes may be employed for obtaining multilayer films such as those used in the "repositionable" packaging field; mention may be made of lamination-coating, coextrusion-coating, flat coextrusion and coextrusion-blowing of a film bubble (Ref: *Plastics Extrusion Technology*, Friedhelm Hensen Editor, Carl Hanser Verlag, Munich, 1988).

Patent EP 0 160 975 (NYFFELER, CORTI AG) discloses a hot- or cold-sealable multilayer sheet for recloseable packages. The structure disclosed comprises in particular "a permanently tacky sheet consisting of a pressure-sensitive adhesive, being composed for example of hot-melt adhesive products (hot-melt adhesives) based on ethylene/vinyl acetate (EVA) copolymers, styrene/butadiene/styrene block copolymers (SBS), styrene/isoprene/styrene block copolymers (SIS), or polyacrylates, or the like". The adhesive formulations are described very briefly and the claimed structure is obtained by optimizing the process and not the adhesive. The process used requires a priori a large number of steps.

U.S. Pat. No. 5,089,320 (JAMES RIVER) relates to a multilayer film for recloseable packaging obtained by coextrusion or coextrusion coating. That patent describes more precisely the adhesives employed, namely PSAs comprising 40 to 80 wt % of a thermoplastic elastomer, such as a styrene/isoprene/styrene block copolymer (SIS) or a styrene/butadiene/styrene block copolymer (SBS) such as KRATON® D-1107 (from Kraton Polymers) and 20 to 60% of a tackifier such as an oil-based resin (ESCOREZ® 1310 LC from Exxon Mobil Chemical). That patent mentions opening forces of 4 to 9 N/cm and reopening forces of 1 to 7 N/cm, the examples cited showing only low reopening values of around 1 to 2 N/cm.

GB patent 2 319 746 (DOLPHIN PACKAGING MATERIALS LIMITED) discloses two films, one serving as a container after thermoforming, the other serving as a lid intended to be heat-sealed around the outline of the first film, and containing a layer of PSA-type adhesive consisting of an elastomer and a tackifying resin such as M3062 from Ato Findley Inc., the sealing layer for the two films being an ionomer, for example a SURLYN® from DuPont, an EMA or an EMA/EBA copolymer. Again, this patent gives a very general description of the adhesive, and the structure is optimized by the process, it being in particular recommended to use ionomer resins as sealing layer, which makes the cost of the package high.

Patent application EP 1 053 953 (SOPLARIL) discloses a recloseable package, both rigid and flexible, both gas-filled and under vacuum, obtained from a coextruded structure. The performance characteristics of the package are obtained here either by optimizing the process, in particular by a bubble reclosure technique with the adhesive as inner layer of the bubble, or by modifying the adhesive, in particular by the addition of fillers or processing aids, which therefore reduces the pressure-sensitive adhesive properties required for reclosure, allowing the contents of the packages to be suitably protected, this drawback being characterized by too low a reopening force.

In short, the multilayer films used in the various packaging systems are not entirely satisfactory, either because the force to be applied to open them is too high or because the reclosure is not of sufficient quality, or else because the desired structure requires a process difficult to implement and incurring a cost burden or a lack of productivity.

It is necessary to have an adhesive that, within the multilayer film, gives the final package produced properties allowing easy first opening and satisfactory reclosing/reopening cycles, without involving complicated process modifications. It is therefore necessary, on the one hand, to have an adhesive exhibiting good processing properties during manufacture of a multilayer film by coextrusion and, on the other hand, the layer of this same adhesive, present within the film, gives the final package properties allowing easy first opening and satisfactory reclosing/reopening cycles. The term "easy first opening" is understood to mean the application of a force of less than or equal to 15 N/cm, with a propagation force, once the package has been opened, of around 5 to 11 N/cm. The adhesive must also make it possible to obtain an easy self-adhering reclosure of the packages, that is to say easy manual repositioning of the two parts of the film after a series of closing/reopening operations, about ten, for reopening forces of greater than 2 N/cm, preferably greater than or equal to 4 N/cm.

A hot-melt adhesive may also be introduced into a multilayer structure using a process that is in tune with economic and industrial requirements. Other techniques of the lamination-coating and coextrusion-coating type have the drawback either of adding an additional step to the process for manufacturing complex films, or of exhibiting drawability or compatibility problems that at the very least may limit the production rates. The incorporation by coextrusion of the adhesive according to the invention as a thermoplastic advantageously makes it possible to meet these requirements. One particularly suitable process for high production rates is the coextrusion-blowing of a bubble.

In the field of adhesives, two types of failure in peel may be distinguished—adhesive failure, which occurs at the adhesive/substrate interface, and cohesive failure that occurs within the actual layer of adhesive, each of the substrates bearing a fraction of the adhesive. A cohesive-type failure considerably improves the "recloseability" property of the package. However, this intrinsic property of the adhesive is in general inconsistent with the viscosity and hot cohesion properties required for coextrusion.

It is therefore necessary to be able to have hot-melt adhesives having both a high hot viscosity (at a temperature of at least 130° C.), allowing coextrusion, and an adjusted cold cohesion (from −20 to +40° C.), allowing predominantly cohesive failure during the first opening, these two properties competing with each other and being difficult to obtain at the same time.

The term "high-viscosity adhesive" is understood to mean an adhesive whose viscosity, measured using the conventional Brookfield method in Thermosel sample chambers according to the ASTM D-3236 standard, is greater than 200,000 mPa·s at a temperature of 200° C.

SUMMARY OF INVENTION

The Applicant has now discovered, unexpectedly, that the pressure-sensitive hot-melt compositions according to the invention are able to reconcile these two opposing properties.

Figure 1:
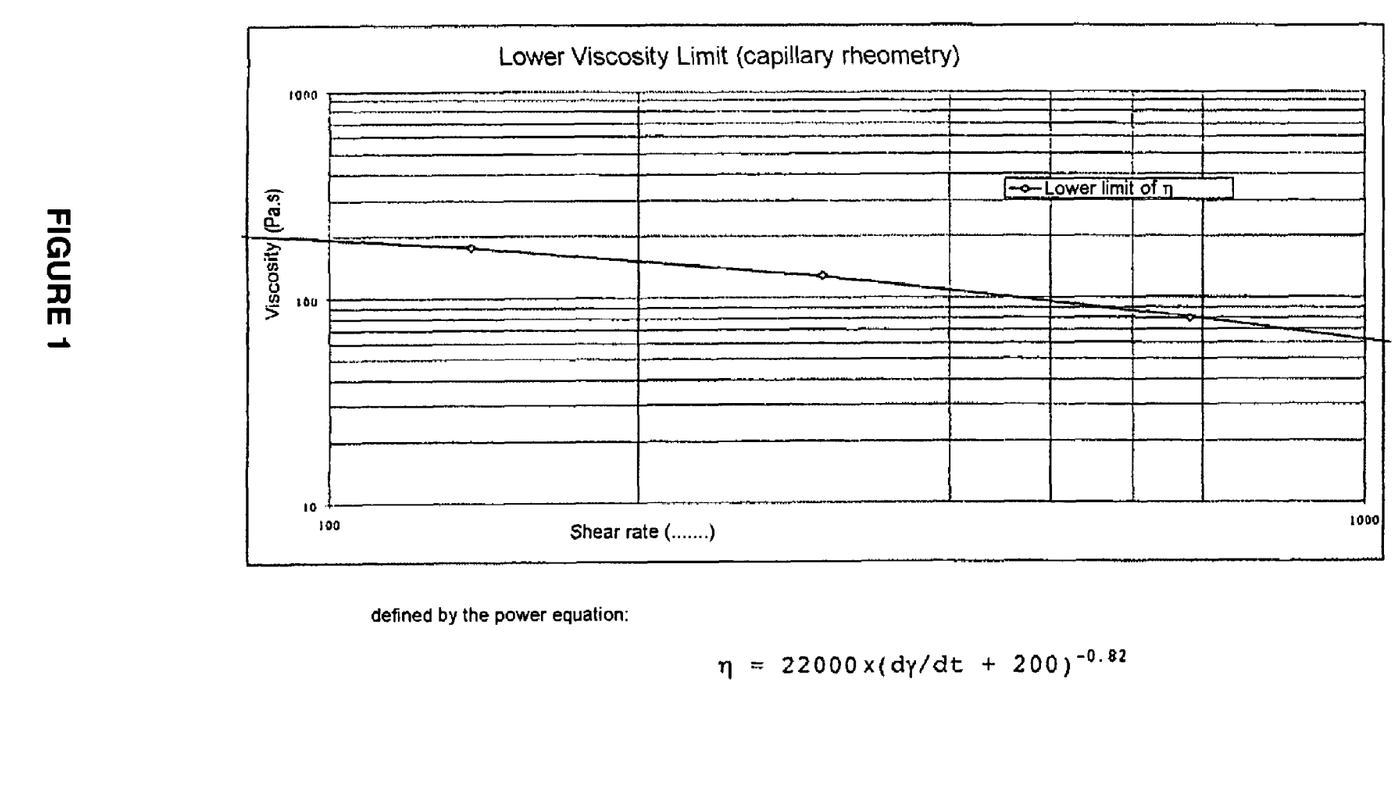
FIG. 1 shows the lower viscosity limit in terms of viscosity (Pa·s) versus shear rate (1/s) for an embodiment of the invention.
Figure 2:
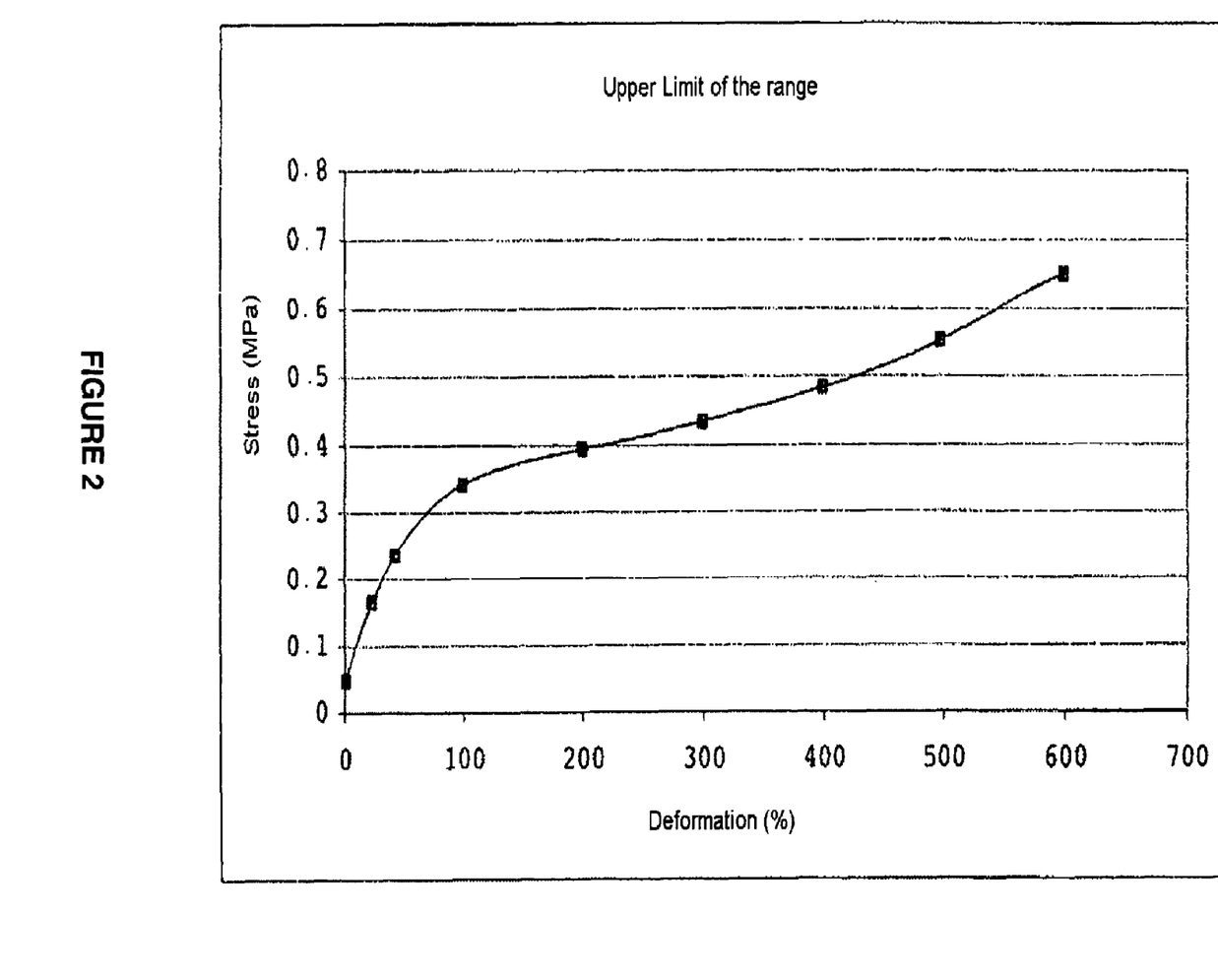
FIG. 2 shows the upper limit of tensile strength for a pull rate of 1 m/s in terms of stress versus percent deformation for an embodiment of the invention.

Thus, the subject of the present invention is hot-melt pressure-sensitive adhesives having, at the temperature of use of the package, generally between −20 and +40° C., an elastic modulus $G' < 5 \times 10^5$ Pa (Dahlquist criterion) and hot-extrudable, comprising:
  at least one styrene block copolymer; and
  at least one compatible tackifying resin, such that this blend has:
  a viscosity η (measured according to the ISO 11443 standard), at a temperature of at least 130° C.—the coextrusion processing temperature
  and for a shear rate $d\gamma/dt$ of between 100 and 1,000 s$^{-1}$, lying within a range located above the curve (See FIG. 1):

and a tensile strength for a pull rate of 1 ms$^{-1}$ lying within a range located below the average curve (See FIG. 2):

as defined by the polynomial equation:

$$y = -2.82 \times 10^{16} x^6 + 5.92 \times 10^{-13} x^5 - 4.97 \times 10^{-10} x^4 + 2.15 \times 10^{-7} x^3 - 4.99 \times 10^{-5} x^2 + 6.26 \times 10^{-3} x + 4.71 \times 10^{-2},$$

in which y—the ordinate—represents the stress expressed in MPa and x—the abscissa—represents the deformation expressed as a percentage (%).

The tensile strength for a pull rate of 1 m·s$^{-1}$ is measured using the following method:
  dumbbells are cut, using a blanking die of the H2 type, from 80×80×2 mm plaques of a hot-melt pressure-sensitive adhesive that were prepared before-hand at 160° C. with a pressure and venting cycle;
  the tensile test is carried out by means of a hydraulic mechanical testing machine of the MTS 831 type. The distance between the jaws (or useful length $L_0$) is 50 mm and the maximum displacement of the hydraulic ram L is 320 mm, which makes it possible to achieve a maximum deformation of 640% (100×L/$L_0$). The rate of displacement of the piston is set at 1 m·s$^{-1}$. During the test, the strain is recorded as a function of the displacement. The experimental curves plot the stress (expressed in MPa) as a function of the deformation (expressed in %).

The block copolymers according to the invention are obtained from styrene monomers and from at least one other comonomer, such as ethylene, propylene, isoprene, butadiene and butylene. They possess structures of the linear, radial or star-shaped, diblock, triblock or multiblock type, the intermediate block consisting of at least one of the abovementioned comonomers.

DETAILED DESCRIPTION OF PREFERRED EMBODIMENTS

The block copolymer or the blend of block copolymers according to the invention comprises:
  a mass percentage of the styrene phase in the polymer of between 10 and 35% and preferably between 10 and 25%;
  a mass percentage of diblock structures in the polymer of greater than 30% and preferably greater than 40%; and
  a melt flow index (MFI) according to condition No. 10 of the NFT 51-016 standard of between 2 and 40 g/10 min.

As compatible tackifying resin, a resin or a blend of resins conventionally used in hot-melt adhesives will be used, such as:
  rosin or its derivatives, especially rosin esters, optionally hydrogenated ones;
  polyterpenes, terpene phenolics or derivatives thereof; and
  optionally hydrogenated polymers coming from aliphatic or aromatic cuts or blends of these cuts; having a softening point measured according to the EN 1238 standard of between 5 and 150° C., and preferably between 80 and 140° C.

To give the hot-melt adhesive according to the invention tack suitable for the application, the predominant resin is chosen with a pronounced aliphatic character, so as to obtain sufficient compatibility between the resin and the elastomeric phase, that is to say the non-styrenic phase of the block copolymer. The choice of this predominant resin is guided by the determination of its cloud point in a solvent, carried out according to the method below.

Five grams of resin are dissolved hot in 10 milliliters of a ½ mixture by volume of methylcyclohexane and aniline and the solution is cooled to room temperature until the appearance of a phase separation. According to the conditions of this test, the predominant resin having a benefit for the tack of the adhesive according to the invention is chosen with a phase separation temperature above 60° C., and preferably above 75° C.

The predominant resin will be chosen more particularly from polyterpene families, polymers coming from $C_5$ cuts, optionally modified by $C_9$ cuts, polymers coming from partially or completely hydrogenated $C_9$ cuts optionally modified by aliphatic cuts.

The adhesive according to the invention will generally consist of:
  45 to 85%, preferably 55 to 70%, by weight of copolymer or a blend of copolymers; and
  15 to 55%, preferably 30 to 45%, by weight of tackifying resin or a blend of tackifying resins.

The adhesive according to the invention may also contain a small fraction of a plasticizer, a stabilizer or a filler, these being additives conventionally used in hot-melt adhesives.

For their use in coextrusion, the adhesives of the invention must be in the form of granules. The hot-melt pressure-sensitive adhesive granules according to the invention may be obtained using a conventional manufacturing process, the mixing of the constituents being obtained by hot extrusion (twin-screw extruder, Buss® co-kneader or the like) followed thereafter by granulation of the underwater cutting type with coating of the granules (for example coating with a mineral filler such as talc).

During manufacture of the multilayer film, the hot-melt pressure-sensitive adhesive in granule form is coextruded between two thermoplastics (at least) by coextrusion-blowing of a bubble so as to obtain a three-layer film (at least), which film then has one face that is sealable and separable (or tearable) and another face that can be complexed with another film for the production of a package.

A representative example of a three-layer film, produced with the hot-melt pressure-sensitive adhesive according to the invention, has the following thicknesses:

a sealable and separable layer of 10 to 100 µm, preferably 10 to 30 µm;

a hot-melt pressure-sensitive adhesive layer of 10 to 30 µm, preferably 15 to 20 µm; and a complexable layer of 10 to 100 µm, preferably 10 to 30 µm.

During coextrusion, the hot-melt adhesive is preplasticized by passage along a screw with a smooth barrel, having a low shear in the feed zone. The temperature profile chosen for the adhesive will generally go from about 50° C. at the screw entry to about 140° C. at the screw exit—said profile may be adapted according to the geometry of the screw adopted.

The hot-melt pressure-sensitive adhesive layer is formed and combined between the sealable layer and the complexable layer into a three-layer film by bubble coextrusion-blowing. The temperature of the die is set according to the theological characteristics of the materials chosen for the sealable and complexable layers, but preferably is less than or equal to 180° C.

The usual characteristics of the sealable and separable layer are well known to those skilled in the art of coextrusion processing. The layer contains, for example, one of the following materials (or a blend of these materials): EVA, grafted EVA (for example: grafted with maleic anhydride, HEA, etc.), EMA, PE, metallocene PE, grafted PE, grafted PP or an ionomer (for example: SURLYN® from DuPont); together with additives such as antioxidants, fillers, slip agents, etc., that provide the separability, thermal stability, color and other desirable ancillary properties of the films to be used in packaging.

Likewise, the usual characteristics of the complexable layer, that are known to those skilled in the art of coextrusion processing, are for example the following:

it contains one of the following materials (or a blend of these materials): EVA, grafted EVA (for example: grafted with maleic anhydride, HEA, etc.), EMA, PE, metallocene PE, grafted PE, grafted PP or an ionomer (for example: SURLYN® from DuPont), etc.; together with additives such as antioxidants, fillers, slip agents, etc., that provide the thermal stability, color and other desirable ancillary properties of the films to be complexed and used in packaging;

this layer may be of the same kind as the tearable sealable layer; and it is corona-treated before the film is wound with a treatment of greater than 30 mN·m$^{-1}$ so as to be then transferred to another film by lamination.

The three-layer film obtained may be laminated to a non-sealable film so as to give the final package mechanical properties, barrier properties, printing properties, etc. As an example of the added film, mention may be made in a non-limiting manner of the following materials: PET, metallized PET, OPP, OPA, CPA, PVC, APET, PAN, etc.

The structure thus described (coextruded and then complexed) may be employed within the context of an industrial packaging process (bags, Doypacks® or thermoformed trays, etc.), the structure thus possibly being heat-sealed to itself or to a suitable support. The package thus obtained by heat sealing remains completely sealed when being handled. The structure may be peeled manually and easily when the package is opened for the first time, the sealing and separable layer being broken in such a way that the adhesive appears on the surface in the sealing region. The package may be reclosed by repositioning the structure in the initial weld region by simple manual pressure. Successive reopening and reclosing operations are possible.

Depending on the structures chosen, if a cohesive failure is obtained in the hot-melt adhesive layer according to the invention upon opening the package for the first time, the maximum propagation force at the first opening of the package will generally be less than or equal to 11 N/cm (which characterizes easy-open packages). If an adhesive failure is obtained, the opening force will then automatically be less than the cohesion force of the hot-melt adhesive. This type of failure will also be characteristic of an easy-open package, but runs the risk of having adhesion properties on reclosure that are inferior to the requirements of the use. For the application, the forces for the next 5 reopening operations will have values of greater than around 2 N/cm and preferably greater than or equal to 4 N/cm.

The hot-melt pressure-sensitive adhesives according to the invention, taken individually or incorporated in a multilayer structure, may be easily identified using conventional analytical deformulation techniques such as:

dissolving and semipreparative liquid chromatography followed by identification of the various fractions by infrared spectroscopy, gel permeation chromatography, nuclear magnetic resonance or differential calorimetry DSC);

infrared microscopy or nuclear magnetic resonance imaging (MRI) directly on the multilayer films.

EXAMPLES

The examples and comparative examples that follow illustrate the invention. In the examples, the effectiveness of various hot-melt pressure-sensitive adhesive compositions is compared. Composition 1 is an example according to the invention while composition 2 is an example outside the invention.

In examples 1 and 2 that follow, the hot-melt pressure-sensitive adhesives are characterized by:

a viscosity profile measured by capillary rheometry (according to the ISO 11443 standard) at a temperature of 150° C. for a shear rate lying between 1,000 s$^{-1}$ and 1,000 s$^{-1}$;

a tensile strength profile for a pull speed of 1 m·s$^{-1}$, measured using the method described above;

a polymer composition consisting of blends of SIS, KRATON® D1111 and/or D1113 copolymers from Kraton Polymers;

a tackifying resin composition consisting of a polyterpene resin blend, SYLVARES® TR7115 from Arizona Chemicals, characterized by a softening point of 115° C. (ring-and-ball method) and a weight-average molecular weight of around 1,100 g/mol and of a resin coming from the polymerization of $C_5$ cuts, WINGTACK® 95 from Goodyear Chemicals, characterized by a softening point of the order of 95° C. (ring-and-ball method) and a weight-average molecular weight of around 2,000 g/mol.

In example 3, the adhesives of examples 1 and 2 were used in succession in a three-layer structure so as to compare their application performance. The film preparation and evaluation properties were the following:

A three-layer film was prepared by bubble coextrusion-blowing and had the following structure:

20 μm of a complexable layer corona-treated to more than 38 mN/m;

20 μm of a hot-melt pressure-sensitive adhesive; and

20 μm of a sealable separable layer.

The complexable layer had as composition:

60% by weight of a polyolefin resin obtained by single-site catalysis, ENGAGE® 8480 from Dow Chemicals;

35% of an LDPE resin, LACQTENE® 1004FE30 from Atofina; and

5% of additives: the masterbatch FSU 105E from Schulman as slip agent and the masterbatch SILICE F15C from Schulman as antiblock agent.

The layer of adhesive had as composition, in succession, that described in example 1 and then that described in example 2.

The welding layer had as composition by weight:

65% by weight of a polyolefin resin obtained by single-site catalysis, ENGAGE® 8480 from Dow Chemicals;

20% of an LDPE resin, LACQTENE® 1020FE30;

10% of a masterbatch giving the sealable layer separability; and

5% of additives: the masterbatch FSU 105E from Schulman as slip agent and the masterbatch SILICE F15C from Schulman as antiblock agent.

The three-layer film was produced by bubble coextrusion-blowing on a Compex 50/60/50 SA machine from Kiefel. This three-layer film forms part of the construction of the package—a complex structure with a rigid film and a cover film.

A rigid film A and a cover film B are welded together along the edges of the package, the welding technique allowing this sealing region to be weakened.

The edge of the package with the rigid film A is welded to the cover film B in the weakened region before the package is opened. The cover film is formed from a sealing layer, a tie layer and a support layer. The multilayer film of the invention constitutes one element of the rigid film A. The multilayer film comprises sealable and separable film, the film of adhesive of the invention and a complexable film, the latter being joined to the rigid support film by means of a tie—a complexing adhesive. The rigid film A and cover film B are welded by means of two sealing layers, thus forming the weakened region.

When the package has been opened, a fraction of the separable layer, to which a fraction of the adhesive layer is attached, is bonded to the sealing layer in the weakening region.

To evaluate the opening and the reclosing performance of the structure produced, the three-layer film thus described was then laminated to a 350 μm rigid PVC film on a solvent laminator, thus forming the rigid film A. The lamination was carried out using a polyurethane adhesive as solvent—the two-component adhesive Colflex® LG 59 A/B from Bostik Findley, the adhesive being deposited on the complexable face of the three-layer film.

The cover film B used for the example had the following composition:

15 μm of PVDC-coated biaxially oriented PET;

3 μm of polyurethane adhesive;

23 μm of biaxially oriented PET;

3 μm of polyurethane adhesive; and

50 μm of welding layer.

The welding layer of the cover film had as composition:

49% of LDPE resin;

48% of an octene linear PE resin; and

3% of additives (slip and antiblock agents).

For the final application, the rigid film A is designed to be thermoformed. For the measurements below, there was no thermoforming of the film before the rigid film A was welded to the cover film B.

The films A and B making up the package were welded together using a rubber welding bar and a flat, PTFE-coated metal welding bar heated to 160° C., in contact with the cover film B. The weld was produced by applying a pressure of 5 bar for 3 seconds.

The weld was made over an area of 10 mm×150 mm on 25 mm×250 mm specimens of film A with 25 mm×400 mm test pieces of film B.

The force needed for the first opening in the weld was measured by a 180° peel strength test at 200 mm·min$^{-1}$ on a 5543 test machine from Instron (according to the NFT 54-122 standard) carried out after 24 hours of conditioning at 23° C. and 50% humidity after welding.

The peel strength measurement at the first reopening was carried out on manually opened test pieces. The two films, A and B, were immediately repositioned in the welding region and were sealed by means of two unheated flat metal welding bars. The sealing was then carried out by applying a pressure of 0.5 bar for 3 seconds. The force needed for reopening the weld was measured by a 180° peel strength test at 200 mm·min$^{-1}$ on a 5543 test machine from Instron (according to the NFT 54-122 standard) carried out after 24 hours of conditioning at 23° C. and 50% humidity after resealing. This handling operation was repeated on the same test piece so as to measure the peel strength for the following reopening operations.

For each measurement, the peel strength results given are averages on three test pieces and are expressed in N/cm.

Example 1

According to the Invention

The composition of the hot-melt pressure-sensitive adhesive 1 according to the invention is given in table A below:

TABLE A

| | COMPOSITION 1 |
|---|---|
| Nature of polymer fraction | SIS |
| Polymer in the adhesive (wt %) | 65 |
| Styrene in the polymer phase (wt %) | 18.0 |
| Diblocks in the polymer phase (wt %) | 45.0 |

TABLE A-continued

|  | COMPOSITION 1 |
| --- | --- |
| Calculated MFI of the polymer phase (g/10 min) (calculated centroid of the MFIs of the polymers used, weighted by their mass fraction within the polymer fraction) | 18.0 |
| Polyterpene resin in the resin phase (wt %) | 50 |
| Capillary rheometry at 150° C. and 1 000 s$^{-1}$ (Pa · s) | 107.0 |
| Maximum force at 640% elongation (MPa) with a pull rate of 1 m/s | 0.5 |

Figure 5:
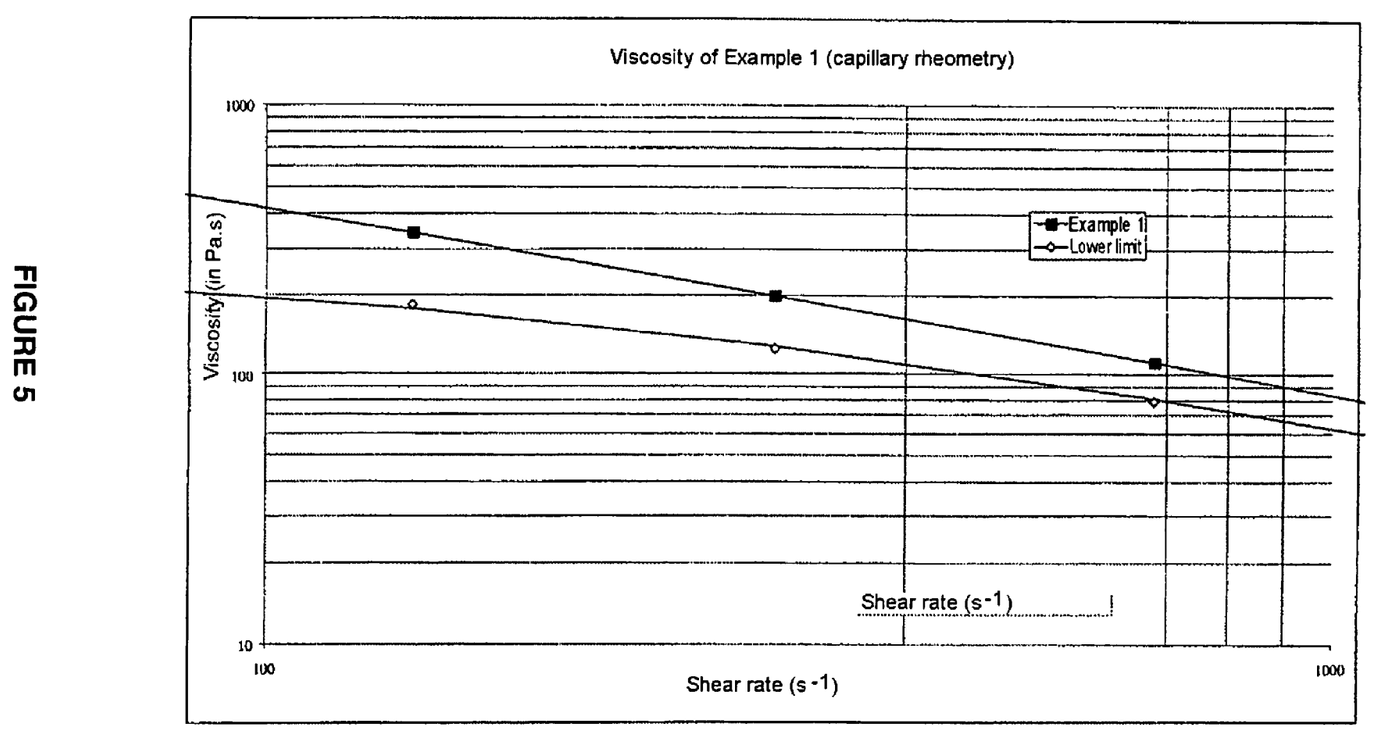
FIG. 5 shows the viscosity of example 1 in terms of viscosity (Pa·s) versus shear rate (1/s).

This composition had a viscosity profile between 100 and 1,000 s$^{-1}$ lying within the claimed range, namely above the previously defined lower limit and a tensile strength at 1 m·s$^{-1}$ lying within the claimed range, namely below the previously defined upper limit (See FIG. 5).

Figure 6:
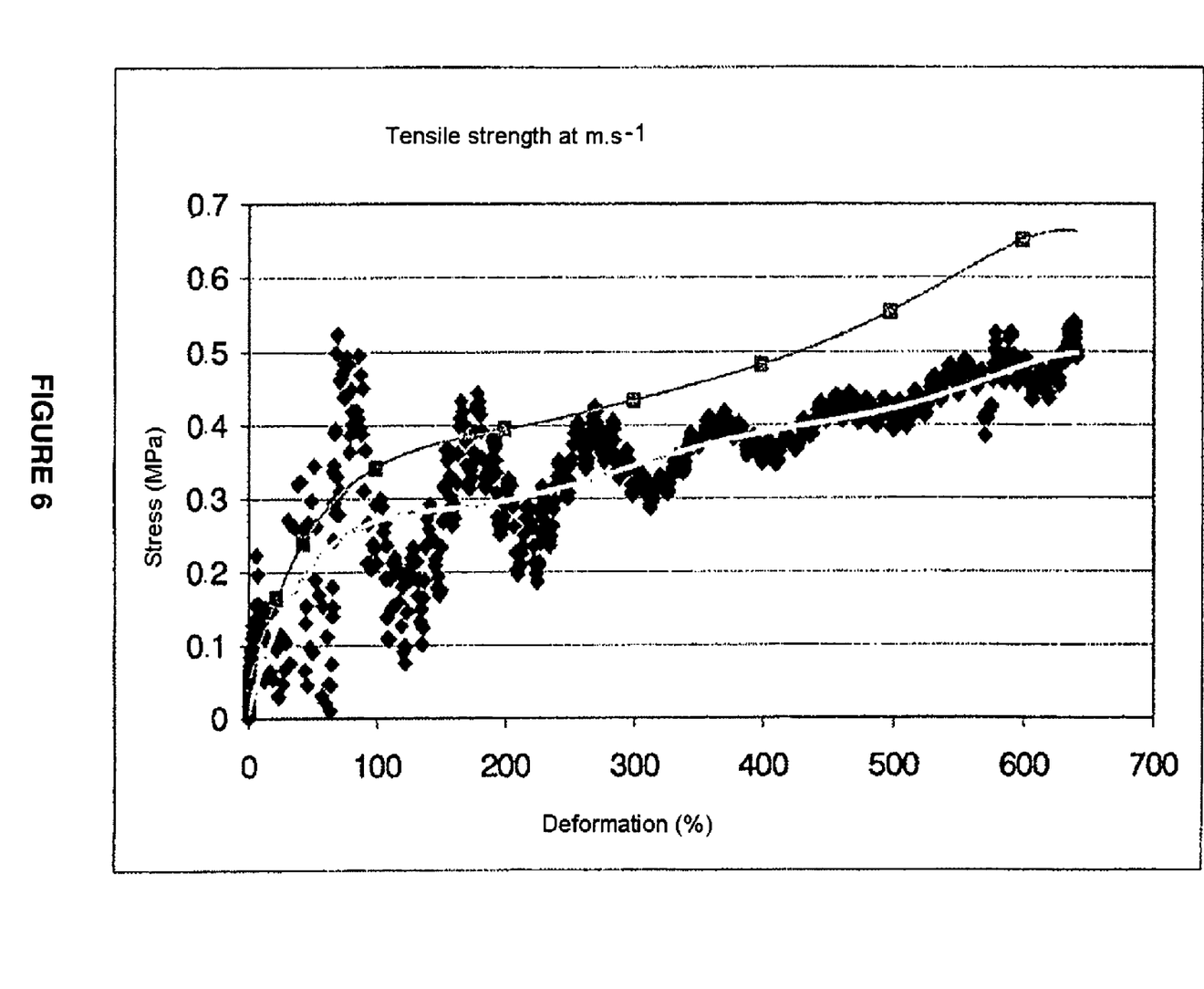
FIG. 6 shows the tensile strength of example 1 in terms of stress (mPa) versus percent deformation.

Since all the conditions according to the invention are met, the adhesive of example 1 perfectly illustrates the invention (See FIG. 6).

Example 2

Outside the Invention

The hot-melt pressure-sensitive composition 2 not according to the invention is given in table B below:

TABLE B

|  | COMPOSITION 2 |
| --- | --- |
| Nature of polymer fraction | SIS |
| Polymer in the adhesive (wt %) | 60 |
| Styrene in the polymer phase (wt %) | 22.0 |
| Diblocks in the polymer phase (wt %) | 15.0 |
| Calculated MFI of the polymer phase (g/10 min) (calculated centroid of the MFIs of the polymers used, weighted by their mass fraction within the polymer fraction) | 2.0 |
| Polyterpene resin in the resin phase (wt %) | 60 |
| Capillary rheometry at 150° C. and 1 000 s$^{-1}$ (Pa · s) | 170.0 |
| Maximum force at 640% elongation (MPa) with a pull rate of 1 m/s | 1.3 |

Figure 3:
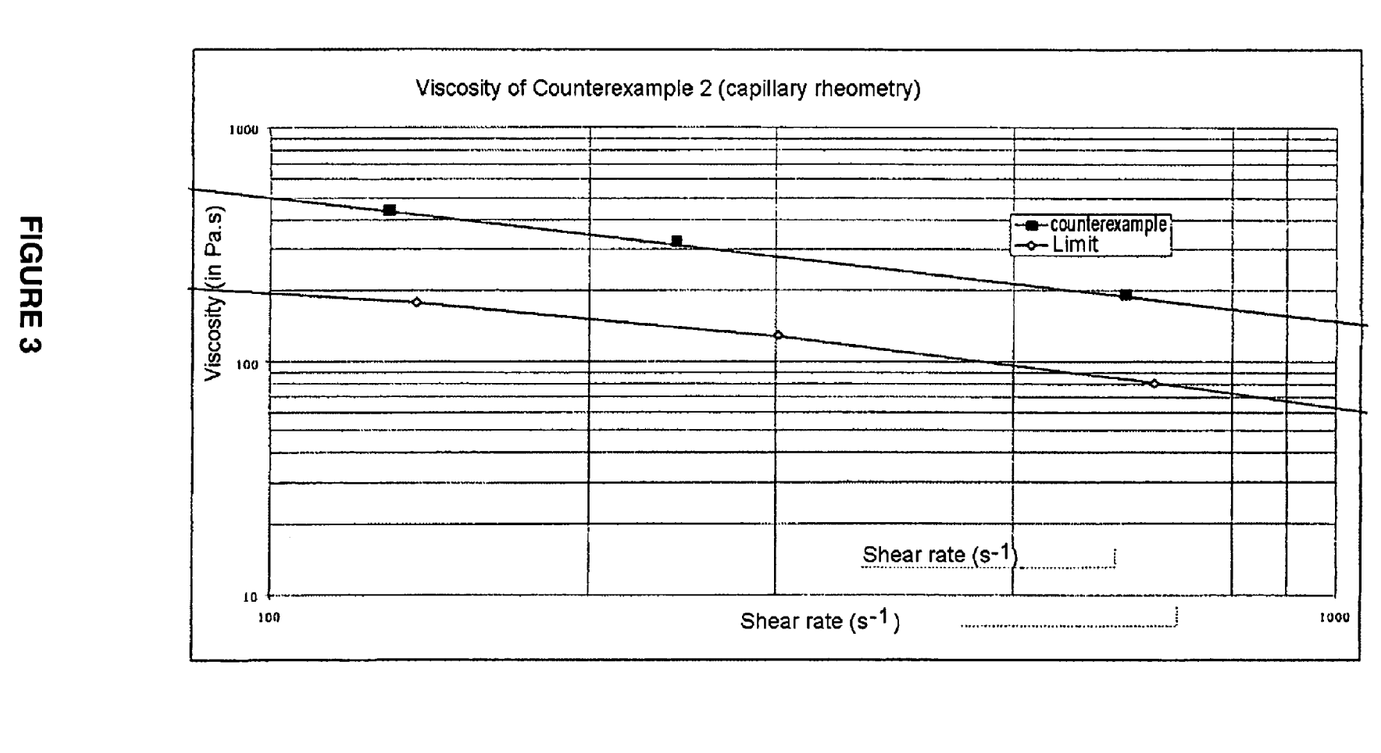
FIG. 3 shows the viscosity of counterexample 2 in terms of viscosity (Pa·s) versus shear rate (1/s).

This composition has a viscosity profile between 100 and 1,000 s$^{-1}$ lying above the previously defined lower limit, but a tensile strength at 1 m·s$^{-1}$ above the previously defined limit because of its low diblock content (See FIG. 3).

Figure 4:
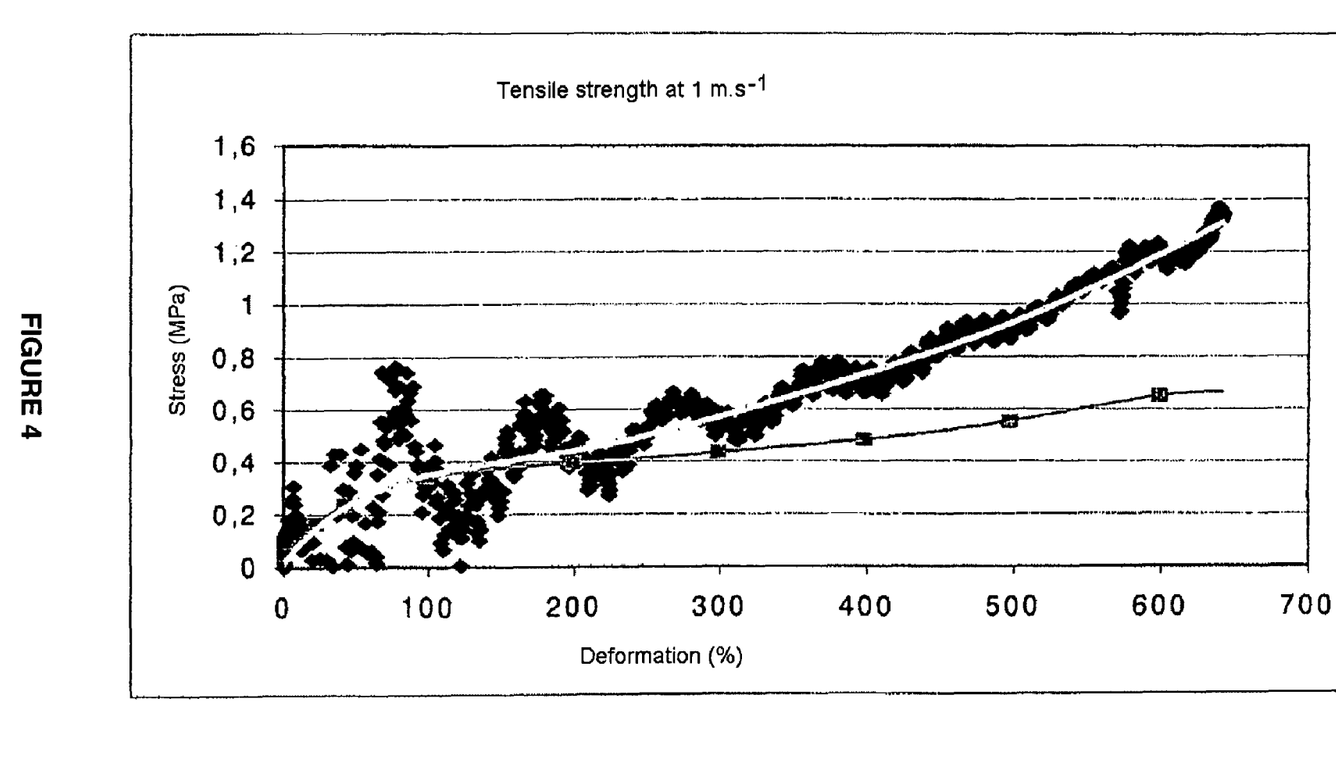
FIG. 4 shows the tensile strength of counterexample 2 in terms of stress (mPa) versus percent deformation.

Since only one of the two conditions according to the invention is met, example 2 perfectly illustrates the state of the prior art as regards hot-melt pressure-sensitive adhesive and does not correspond to the criteria according to the invention (See FIG. 4).

Example 3

Comparative Example

Evaluation on a three-layer film obtained by bubble coextrusion-blowing and then use in a package structure as were described above.

Example 3 illustrates the impact and the advantages of composition 1 according to the invention. It is compared with composition 2 that is not according to the invention and is characteristic of the adhesives of the prior art.

The following results were obtained (table C):

TABLE C

|  | COEXTRUDED, COMPLEXED AND WELDED STRUCTURE BASED ON COMPOSITION 1 | COEXTRUDED, COMPLEXED AND WELDED STRUCTURE BASED ON COMPOSITION 2 |
| --- | --- | --- |
| Initiation at 1st opening in peel at 200 mm/min (N/cm) | 14.7 | >30 |
| Propagation of the 1st opening in peel at 200 mm/min (N/cm) | 9.8 | 27 |
| 2nd opening in peel at 200 mm/min after 1 manual repositioning operation (N/cm) | 6 | 9 |
| 5th opening in peel at 200 mm/min after 4 manual repositioning operations (N/cm) | 4 | 7 |
| Failure mode at the first opening | Cohesive | Cohesive |

For the structure produced using composition 1 according to the invention, the forces needed to initiate and propagate the first opening are characteristic of an easy-open package. These forces, that are very high for the structure produced from composition 2, make it difficult to open the package.

The forces measured during reopening after repositioning the film are high in the case of the structures produced from the two compositions, which is the desired aim, so as to obtain good isolation within the package.

The benefit of composition 1 for the production of multilayer films intended for "repositionable" easy-open/reclose packages is thus demonstrated through this comparative example. The packages using these multilayer films, obtained beforehand by coextrusion, exhibit an excellent compromise between easy opening and good reclosing.

The invention claimed is:

1. A hot-extrudable pressure-sensitive hot-melt adhesive, in the form of a granule, comprising a blend of:
   at least one styrene block copolymer formed from at least one styrene monomer and at least one other comonomer, said at least one styrene block copolymer comprising:
      a mass percentage of the styrene phase in the polymer of between 10 and 35%; and
      a mass percentage of diblocks in the polymer of greater than 30%; and
   at least one compatible tackifying resin,
wherein said hot-extrudable pressure-sensitive hot-melt adhesive is in the form of a granule possessing:
   a viscosity, at a temperature of at least 130° C., lying within a range located above the power curve:

$\eta = 22\,000 \times (d\gamma/dt + 200)^{-0.82}$ wherein $d\gamma/dt$ comprises a shear rate between 100 and 1,000 s$^{-1}$;
   a tensile strength at a pull rate of 1 ms$^{-1}$ lying within the range located below the polynomial curve:

$y = -2.82 \times 10^{-16} x^6 + 5.92 \times 10^{-13} x^5 - 4.97 \times 10^{-10} x^4 + 2.15 \times 10^{-7} x^3 - 4.99 \times 10^{-5} x^2 + 6.26 \times 10^{-3} x + 4.71 \times 10^{-2}$, wherein y comprises an ordinate representing the stress expressed in MPa and x comprises an abscissa representing the deformation expressed in %;
   a weight content of copolymers of 45 to 85%;
   a weight content of resin of 15 to 55%;

an elastic modulus $G'<5\times10^5$ Pa at −20 to +40° C.; and an adjusted cold cohesion such that the hot-extrudable pressure sensitive adhesive is capable of exhibiting predominately cohesive failure during the first opening.

2. The adhesive of claim 1, wherein the at least one styrene block copolymer further comprises:

a melt flow index (MFI) according to condition No. 10 of the NFT 51-016 standard of between 2 and 40 g/10 min.

3. The adhesive of claim 2, wherein the at least one other comonomer comprises isoprene, butadiene, butylene, or a combination thereof.

4. The adhesive of claim 2, wherein the at least one styrene block copolymer comprise diblock structures, wherein said diblock structures are used by themselves or as a blend with other styrene polymers.

5. The adhesive of claim 4, wherein said other styrene polymers comprise linear structures, radial or star-shaped triblock structures, or multiblock structures.

6. The adhesive of claim 4, wherein said diblock structures comprise an intermediate block, said intermediate block comprising isoprene, butadiene, butylene, or a combination thereof.

7. The adhesive of claim 2, wherein the mass percentage of the styrene phase in the polymer is between 10 and 25%.

8. The adhesive of claim 2, wherein the mass percentage of diblocks in the polymer is greater than 40%.

9. The adhesive of claim 2, wherein said at least one compatible tackifying resin comprises a resin or a blend of resins, said resin or blend of resins comprising a softening point measured according to the EN 1238 of between 5 and 150° C.

10. The adhesive of claim 9, wherein the softening point is between 80 and 140° C.

11. The adhesive of claim 2, wherein the respective weight contents of copolymers and resins are 55 to 70% of copolymer and 30 to 45% of resin.

12. The adhesive of claim 1, wherein said at least one styrene block copolymer is a copolymer of the styrene/isoprene/styrene type.

13. The adhesive of claim 1, wherein said at least one compatible tackifying resin comprises a resin or a blend of resins, said resin or blend of resins comprising a softening point measured according to the EN 1238 of between 5 and 150° C.

14. The adhesive of claim 13, wherein said at least one compatible tackifying resin comprises a predominant resin having a pronounced aliphatic character.

15. The adhesive of claim 13, wherein the softening point is between 80 and 140° C.

16. The adhesive of claim 13, wherein said resin or blend of resins comprises rosin, hydrogenated rosin, rosin derivative, hydrogenated rosin derivative, rosin ester, hydrogenated rosin ester, polyterpene, terpene phenolic, terpene phenolic derivative, hydrogenated polymer of aliphatic or aromatic cuts or blends of these cuts, or a combination thereof.

17. The adhesive of claim 1, wherein said adhesive further comprises plasticizer, stabilizer, filler, or a combination thereof.

18. A process for manufacturing the adhesive of claim 1, wherein the adhesive is processed in the form of granules by hot extrusion followed by cutting under water.

19. The adhesive of claim 1, wherein the respective weight contents of copolymers and resins are 55 to 70% of copolymer and 30 to 45% of resin.

20. The adhesive of claim 1, wherein the at least one styrene block copolymer comprises a mass percentage of the styrene phase in the polymer of between 10-25%.

21. The adhesive of claim 1, wherein the at least one styrene block copolymer comprises a mass percentage of diblocks in the polymer of greater than 40%.

22. A multilayer film comprising at least a first layer, a second layer and a third layer, wherein said first layer is sealable and separable, said second layer is complexable, and said third layer provides the cohesion of the assembly and comprises the adhesive of claim 1, wherein the multilayer film is a coextrudate of the adhesive in granule form between at least two thermoplastics.

23. A multilayer film according to claim 22 in which said first layer has a thickness of 10 to 100 μm; said second layer has a thickness of 10 to 100 μm; and said third-layer has a thickness of 10 to 30 μm.

24. A multilayer film according to claim 22 obtained by coextrusion-blowing of a bubble.

25. A multilayer film according to claim 22 wherein the first sealable and separable layer comprises one or more materials or blends of materials of ethylene-vinyl acetate (EVA), grafted EVA, ethylene methyl acyrlate (EMA), PE (polyethylene), metallocene PE, grafted PE, grafted polypropylene (PP), and/or an ionomer.

26. A multilayer film according to claim 22 wherein the second complexable layer comprises one or more materials or blends of materials of EVA, grafted EVA, EMA, PE, metallocene PE, grafted PE, grafted PP, and/or an ionomer.

27. A method for manufacturing an easy tacky recloseable package, comprising sealing the recloseable package with the adhesive of claim 1.

* * * * *

UNITED STATES PATENT AND TRADEMARK OFFICE
CERTIFICATE OF CORRECTION

PATENT NO. : 7,622,176 B2 Page 1 of 1
APPLICATION NO. : 10/637539
DATED : November 24, 2009
INVENTOR(S) : Bardiot et al.

It is certified that error appears in the above-identified patent and that said Letters Patent is hereby corrected as shown below:

On the title page, should read (*) Notice: Subject to any disclaimers, the term of this patent is extended or adjusted under 35 U.S.C. 154 (b) by 474 days.

On the Title Page, Item (30), insert:

-- Foreign Application Priority Data,
February 26, 2001 (FR) 0101879 --.

Signed and Sealed this

Seventeenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,622,176 B2
APPLICATION NO. : 10/637539
DATED : November 24, 2009
INVENTOR(S) : Bardiot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 474 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,622,176 B2  
APPLICATION NO. : 10/637539  
DATED : November 24, 2009  
INVENTOR(S) : Bardiot et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 474 days.

On the Title Page, Item (30), insert:

-- Foreign Application Priority Data,
February 9, 2001 (FR) 01.01879 --.

This certificate supersedes the Certificates of Correction issued August 17, 2010 and December 14, 2010.

Signed and Sealed this
Fifteenth Day of March, 2011

David J. Kappos
*Director of the United States Patent and Trademark Office*